US011335324B2

(12) United States Patent
Biadsy et al.

(10) Patent No.: US 11,335,324 B2
(45) Date of Patent: May 17, 2022

(54) SYNTHESIZED DATA AUGMENTATION USING VOICE CONVERSION AND SPEECH RECOGNITION MODELS

(71) Applicant: Google LLC, Mountain View, CA (US)

(72) Inventors: Fadi Biadsy, Sandyston, NJ (US); Liyang Jiang, Mountain View, CA (US); Pedro J. Moreno Mengibar, Jersey City, NJ (US); Andrew Rosenberg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 17/008,278

(22) Filed: Aug. 31, 2020

(65) Prior Publication Data

US 2022/0068257 A1    Mar. 3, 2022

(51) Int. Cl.
| G10L 15/06 | (2013.01) |
| G10L 15/16 | (2006.01) |
| G10L 13/04 | (2013.01) |
| G10L 13/047 | (2013.01) |
| G10L 15/22 | (2006.01) |
| G10L 13/08 | (2013.01) |

(52) U.S. Cl.
CPC ............ G10L 13/047 (2013.01); G10L 13/08 (2013.01); G10L 15/16 (2013.01); G10L 15/22 (2013.01)

(58) Field of Classification Search
CPC .......... G10L 15/06; G10L 15/16; G10L 13/04
See application file for complete search history.

(56) References Cited

U.S. PATENT DOCUMENTS

| 10,186,251 B1* | 1/2019 | Mohammadi ........... G10L 15/26 |
| 10,930,263 B1* | 2/2021 | Mahyar ................. G10L 15/005 |
| 2007/0118374 A1 | 5/2007 | Wise et al. |
| 2009/0070115 A1* | 3/2009 | Tachibana ............... G10L 13/00 704/260 |

(Continued)

OTHER PUBLICATIONS

Yamagishi et al.; "Speech synthesis technologies for individuals for vocal disabilities: voice banking and reconstruction"; 2012; The Acoustic Society of Japan; 33, 1; pp. 1-5 (Year: 2012).*

(Continued)

Primary Examiner — Shreyans A Patel
(74) Attorney, Agent, or Firm — Honigman LLP; Brett A. Krueger

(57) ABSTRACT

A method for training a speech conversion model personalized for a target speaker with atypical speech includes obtaining a plurality of transcriptions in a set of spoken training utterances and obtaining a plurality of unspoken training text utterances. Each spoken training utterance is spoken by a target speaker associated with atypical speech and includes a corresponding transcription paired with a corresponding non-synthetic speech representation. The method also includes adapting, using the set of spoken training utterances, a text-to-speech (TTS) model to synthesize speech in a voice of the target speaker and that captures the atypical speech. For each unspoken training text utterance, the method also includes generating, as output from the adapted TTS model, a synthetic speech representation that includes the voice of the target speaker and that captures the atypical speech. The method also includes training the speech conversion model based on the synthetic speech representations.

24 Claims, 9 Drawing Sheets

(56) References Cited

U.S. PATENT DOCUMENTS

| | | | |
|---|---|---|---|
| 2009/0094031 A1* | 4/2009 | Tian | G10L 21/00 |
| | | | 704/251 |
| 2017/0365256 A1 | 12/2017 | Stylianou et al. | |
| 2018/0247640 A1* | 8/2018 | Yassa | G10L 15/065 |
| 2020/0013391 A1 | 1/2020 | Park et al. | |
| 2020/0135172 A1* | 4/2020 | Chen | G10L 13/00 |
| 2020/0312302 A1* | 10/2020 | Lin | G10L 15/16 |
| 2021/0225384 A1* | 7/2021 | Lin | G10L 15/26 |
| 2022/0013106 A1* | 1/2022 | Deng | G10L 13/047 |

OTHER PUBLICATIONS

Intelligibility modification of Dysarthric Speech using HMM-based Adaptive synthesis system, https://ieeexplore.ieee.org/document/7235130, M. Dhanalakshmi, P. Vijayalakshmi, published Mar. 0-31, 2015.

* cited by examiner

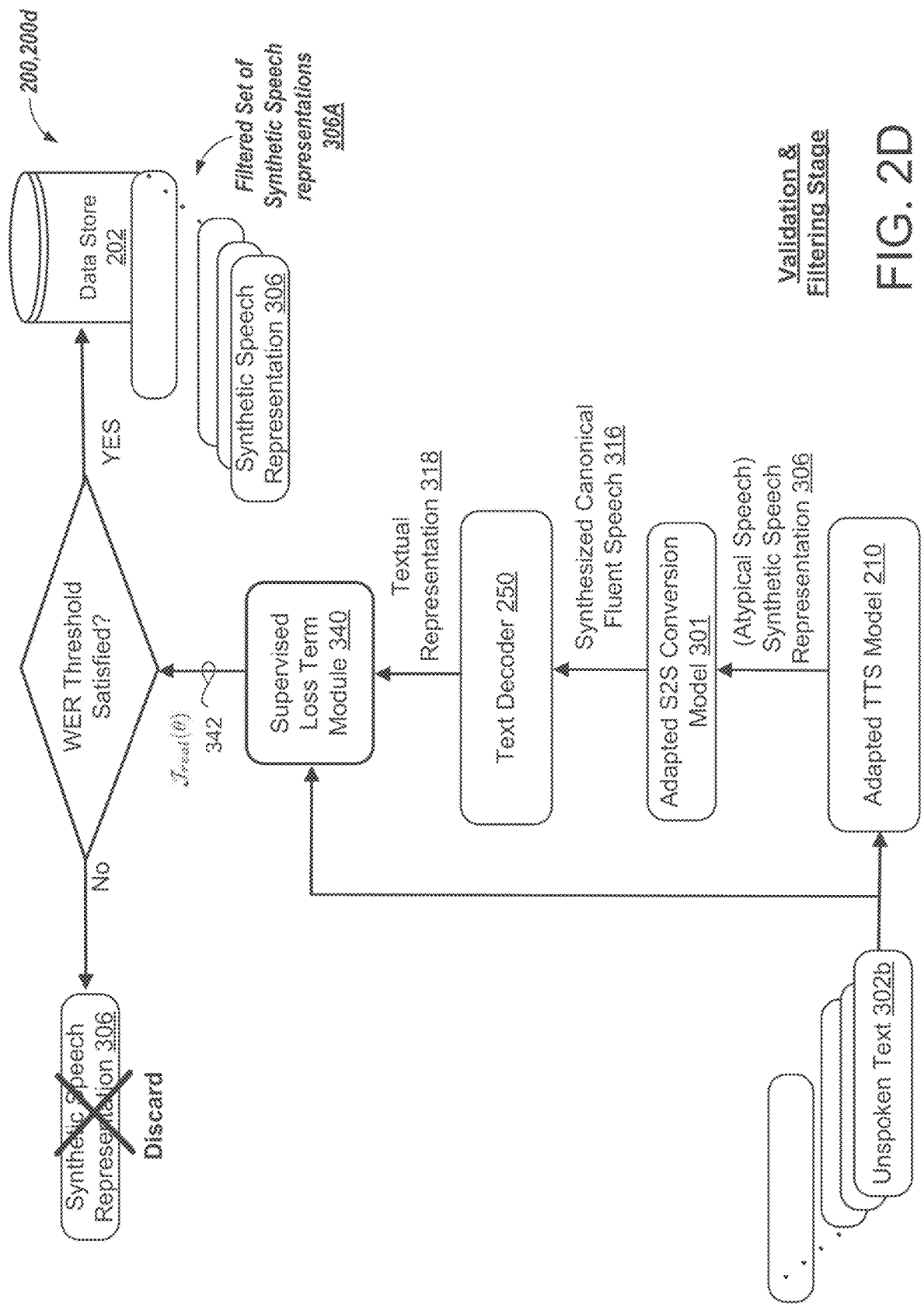

SYNTHESIZED DATA AUGMENTATION USING VOICE CONVERSION AND SPEECH RECOGNITION MODELS

TECHNICAL FIELD

This disclosure relates to synthesized data augmentation using voice conversion and speech recognition models.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text.

One challenge in developing deep learning-based speech conversion models and ASR models is that parameters of these models tend to over fit the training data, thereby resulting in difficulties generalizing unseen data when the training data is not extensive enough. While training speech conversion models and ASR models on larger training datasets improves accuracy, there is a lack of sufficient training data including utterances targeting specific domains (i.e., linguistic diversity) that are spoken by speakers with atypical speech patterns (i.e., acoustic diversity) to achieve acceptable accuracy by these models.

SUMMARY

One aspect of the disclosure provides a method for training a speech conversion model personalized for a target speaker associated with atypical speech. The method includes obtaining, by data processing hardware, a plurality of training text utterances. A first portion of the plurality of training text utterances includes a plurality of transcriptions in a set of spoken training utterances. Each spoken training utterance is spoken by a target speaker associated with atypical speech and includes a corresponding transcription paired with a corresponding non-synthetic speech representation of the corresponding spoken training utterance. A second portion of the plurality of training text utterances includes a plurality of unspoken training text utterances pertaining to a specific domain in which the speech conversion model is trained to learn. Each unspoken training text utterance is not paired with any corresponding spoken utterance. The method also includes adapting, by the data processing hardware, using the set of spoken training utterances, a text-to-speech (TTS) model to synthesize speech in a voice of the target speaker and that captures the atypical speech associated with the target speaker. For each unspoken training text utterance of the plurality unspoken training text utterances, the method includes generating, by the data processing hardware, as output from the adapted TTS model, a synthetic speech representation of the corresponding unspoken training text utterance. The synthetic speech representation includes the voice of the target speaker and captures the atypical speech associated with the target speaker. The method also includes training, by the data processing hardware, the speech conversion model based on the synthetic speech representation generated by the adapted TTS model for each unspoken training text utterance of the plurality of unspoken training text utterances.

Implementations of the disclosure may include one or more of the following optional features. In some implementations, for each synthetic speech representation generated by the adapted TTS model, the method further includes generating, by the data processing hardware, as output from the speech conversion model, a corresponding audio waveform of synthesized canonical fluent speech in the voice of the target speaker, generating, by the data processing hardware, as output from a text decoder, a textual representation for the corresponding audio waveform of synthesized canonical fluent speech generated as output from the speech conversion model; and determining, by the data processing hardware, a word error rate loss associated with the corresponding synthetic speech representation. The word error rate loss is based on the textual representation generated as output form the text decoder for the corresponding audio waveform of synthesized canonical fluent speech and the corresponding unspoken training text utterance. In these implementations, the method also includes, identifying, by the data processing hardware, a filtered set of synthetic speech representations. Each filtered set of synthetic speech representations corresponds to a respective one of the synthetic speech representations generated as output from the speech conversion model that has a word error rate loss that satisfies a word error rate loss threshold. In these implementations, training the speech conversion model based on the synthetic speech representation generated by the adapted TTS model for each unspoken text utterance of the plurality of unspoken text utterances includes training the speech conversion model on the filtered set of synthetic speech representations. The speech conversion model does not train on any of the synthetic speech representations generated as output form the speech conversion model that have word error rate losses that do not satisfy the word error rate loss threshold.

In some examples, the method further includes, when the speech conversion model is not previously trained to convert audio waveforms of input utterances spoken by speakers having a same type of atypical speech as the atypical speech associated with the target speaker, adapting, by the data processing hardware, using the set of spoken training utterances, the speech conversion model to convert audio waveforms of input utterances spoken by the target speaker with atypical speech into audio waveforms of synthesized canonical fluent speech. Here, generating the corresponding audio waveform of synthesized canonical fluent speech includes generating, as output from the adapted speech conversation model, the corresponding audio waveform of synthesized canonical fluent speech in the voice of the target speaker. In some examples, the text decoder resides on the speech conversion model. In other examples, the text decoder resides on a reference automated speech recognition model separate from the speech conversion model.

In some implementations, the speech conversion model includes an end-to-end neural network configured to convert input audio waveforms directly into corresponding output audio waveforms. In these implementations, after training the speech conversion model, the method may also include receiving, at the data processing hardware, an input audio waveform corresponding to an utterance spoken by the target speaker associated with atypical speech, and converting, by the data processing hardware, using the trained speech conversion model, the input audio waveform corresponding to the utterance spoken by the target speaker associated with atypical speech into an output audio waveform corresponding to a synthesized canonical fluent speech representation of the utterance spoken by the target speaker.

In other implementations, the speech conversion model includes an automated speech recognition model configured to convert speech into corresponding text. In these implementations, after training the speech conversion model, the method may also include receiving, by the data processing hardware, audio data corresponding to an utterance spoken by the target speaker associated with atypical speech; and converting, by the data processing hardware, using the trained speech conversion model, the audio data corresponding to the utterance spoken by the target speaker associated with atypical speech into a canonical textual representation of the utterance spoken by the target speaker.

At least a portion of the plurality of unspoken training text utterances in the second portion of the plurality of training text utterances may include manually written text targeting particular phrases that pertain to the particular domain. Optionally, the method may include executing, by the data processing hardware, an unspoken text selection process to obtain the unspoken training text utterances in the unspoken training text utterances in the second portion of the plurality of training text utterances. The text selection process is configured to obtain a corpus of unspoken text utterances. For each unspoken text utterance in the corpus of unspoken text utterances, the text selection process is configured to determine a first probability associated with the unspoken text utterance appearing in a domain-specific language model and determine a second probability associated with the unspoken text utterance appearing in a background language model. The background language model is trained on every unspoken text utterance in the corpus of unspoken text utterances. For each unspoken text utterance in the corpus of unspoken text utterance, the text selection process is also configured to determine a score based on the first probability, the second probability, and a number of words appearing in the corresponding unspoken text utterance. Finally, the text selection process is configured to select, as the unspoken training text utterances in the second portion of the plurality of training text utterances, the unspoken text utterances in the corpus of unspoken text utterances that have the N-best scores.

In some implementations, the TTS model includes a pre-trained reference TTS model that includes an encoder portion and a decoder portion. In these implementations, adapting the TTS model includes adapting the pre-trained reference TTS model by tuning parameters of the decoder portion while parameters of the encoder portion remain fixed.

Another aspect of the disclosure provides a system for training a speech conversion model personalized for a target speaker associated with atypical speech. The system includes data processing hardware and memory hardware in communication with the data processing hardware. The memory hardware stores instructions that when executed on the data processing hardware cause the data processing hardware to perform operations. The operations include obtaining a plurality of training text utterances. A first portion of the plurality of training text utterances includes a plurality of transcriptions in a set of spoken training utterances. Each spoken training utterance is spoken by a target speaker associated with atypical speech and includes a corresponding transcription paired with a corresponding non-synthetic speech representation of the corresponding spoken training utterance. A second portion of the plurality of training text utterances includes a plurality of unspoken training text utterances pertaining to a specific domain in which the speech conversion model is trained to learn. Each unspoken training text utterance is not paired with any corresponding spoken utterance. The operations also include adapting, using the set of spoken training utterances, a text-to-speech (TTS) model to synthesize speech in a voice of the target speaker and that captures the atypical speech associated with the target speaker. For each unspoken training text utterance of the plurality unspoken training text utterances, the operations include generating, as output from the adapted TTS model, a synthetic speech representation of the corresponding unspoken training text utterance. The synthetic speech representation includes the voice of the target speaker and captures the atypical speech associated with the target speaker. The operations also include training the speech conversion model based on the synthetic speech representation generated by the adapted TTS model for each unspoken training text utterance of the plurality of unspoken training text utterances.

Implementations of the disclosure may include one or more of the following optional features. In some implementations, for each synthetic speech representation generated by the adapted TTS model, the operations further include generating, as output from the speech conversion model, a corresponding audio waveform of synthesized canonical fluent speech in the voice of the target speaker, generating as output from a text decoder, a textual representation for the corresponding audio waveform of synthesized canonical fluent speech generated as output from the speech conversion model; and determining a word error rate loss associated with the corresponding synthetic speech representation. The word error rate loss is based on the textual representation generated as output form the text decoder for the corresponding audio waveform of synthesized canonical fluent speech and the corresponding unspoken training text utterance. In these implementations, the operations also include, identifying a filtered set of synthetic speech representations. Each filtered set of synthetic speech representations corresponds to a respective one of the synthetic speech representations generated as output from the speech conversion model that has a word error rate loss that satisfies a word error rate loss threshold. In these implementations, training the speech conversion model based on the synthetic speech representation generated by the adapted TTS model for each unspoken text utterance of the plurality of unspoken text utterances includes training the speech conversion model on the filtered set of synthetic speech representations. The speech conversion model does not train on any of the synthetic speech representations generated as output form the speech conversion model that have word error rate losses that do not satisfy the word error rate loss threshold.

In some examples, the operations further include, when the speech conversion model is not previously trained to convert audio waveforms of input utterances spoken by speakers having a same type of atypical speech as the atypical speech associated with the target speaker, adapting, using the set of spoken training utterances, the speech conversion model to convert audio waveforms of input utterances spoken by the target speaker with atypical speech into audio waveforms of synthesized canonical fluent speech. Here, generating the corresponding audio waveform of synthesized canonical fluent speech includes generating, as output from the adapted speech conversation model, the corresponding audio waveform of synthesized canonical fluent speech in the voice of the target speaker. In some examples, the text decoder resides on the speech conversion model. In other examples, the text decoder resides on a reference automated speech recognition model separate from the speech conversion model.

In some implementations, the speech conversion model includes an end-to-end neural network configured to convert input audio waveforms directly into corresponding output audio waveforms. In these implementations, after training the speech conversion model, the operations may also include receiving an input audio waveform corresponding to an utterance spoken by the target speaker associated with atypical speech; and converting, using the trained speech conversion model, the input audio waveform corresponding to the utterance spoken by the target speaker associated with atypical speech into an output audio waveform corresponding to a synthesized canonical fluent speech representation of the utterance spoken by the target speaker.

In other implementations, the speech conversion model includes an automated speech recognition model configured to convert speech into corresponding text. In these implementations, after training the speech conversion model, the method may also include receiving audio data corresponding to an utterance spoken by the target speaker associated with atypical speech; and converting, using the trained speech conversion model, the audio data corresponding to the utterance spoken by the target speaker associated with atypical speech into a canonical textual representation of the utterance spoken by the target speaker.

At least a portion of the plurality of unspoken training text utterances in the second portion of the plurality of training text utterances may include manually written text targeting particular phrases that pertain to the particular domain. Optionally, the operations may include executing an unspoken text selection process to obtain the unspoken training text utterances in the unspoken training text utterances in the second portion of the plurality of training text utterances. The text selection process is configured to obtain a corpus of unspoken text utterances. For each unspoken text utterance in the corpus of unspoken text utterances, the text selection process is configured to determine a first probability associated with the unspoken text utterance appearing in a domain-specific language model and determine a second probability associated with the unspoken text utterance appearing in a background language model. The background language model is trained on every unspoken text utterance in the corpus of unspoken text utterances. For each unspoken text utterance in the corpus of unspoken text utterance, the text selection process is also configured to determine a score based on the first probability, the second probability, and a number of words appearing in the corresponding unspoken text utterance. Finally, the text selection process is configured to select, as the unspoken training text utterances in the second portion of the plurality of training text utterances, the unspoken text utterances in the corpus of unspoken text utterances that have the N-best scores.

In some implementations, the TTS model includes a pre-trained reference TTS model that includes an encoder portion and a decoder portion. In these implementations, adapting the TTS model includes adapting the pre-trained reference TTS model by tuning parameters of the decoder portion while parameters of the encoder portion remain fixed.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2D is a schematic view of a validation and filtering stage for identifying a filtered set of synthesized speech representations output from the adapted TTS model.

Like reference symbols in the various drawings indicate like elements.

DETAILED DESCRIPTION

Figure 1A:
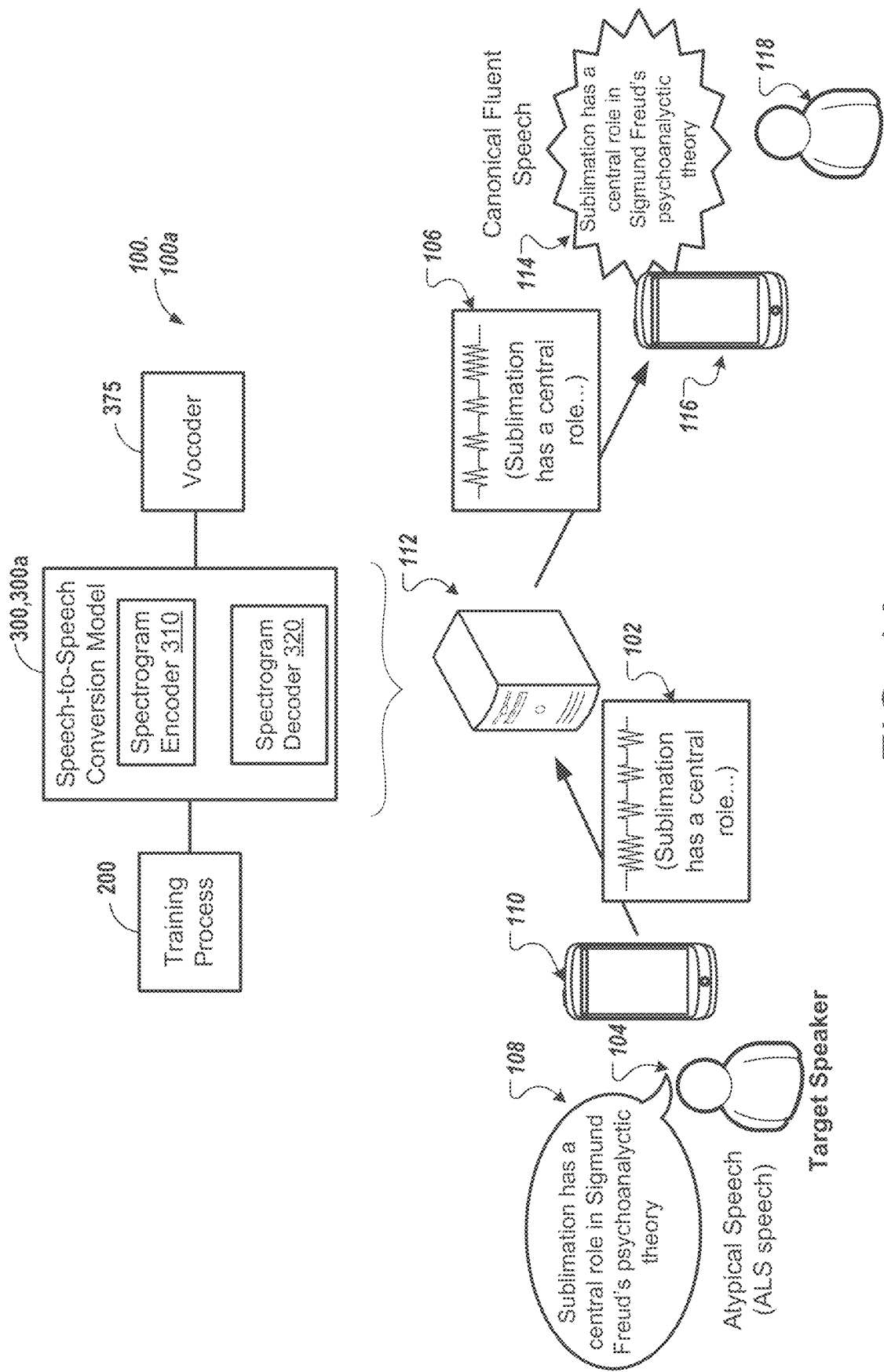
FIG. 1A is a schematic view of an example speech conversion system including a speech-to-speech conversion model.

Automated speech recognition (ASR) has made tremendous strides with the introduction of end-to-end (E2E) deep learning-based models to recognize speech from speakers with atypical speech patterns for conversion into accurate transcriptions. For instance, atypical speech patterns may include, without limitation, impaired speech due to physical or neurological conditions (e.g., speakers with Amyotrophic Lateral Sclerosis (ALS) disease), heavily-accented speech, and deaf speech. Similar deep learning-based models can be applied by speech-to-speech conversion systems to convert speech with atypical speech patterns into canonical fluent output speech. As used herein, and unless specified otherwise, the terms "speech conversion system" and "speech conversion model" can refer to either an ASR system/model, in which input atypical speech is recognized and converted into corresponding text (e.g., transcription), or a speech-to-speech conversion system/model, in which the input atypical speech is directly converted into canonical fluent synthesized speech without performing speech recognition. Stated differently, the speech-to-speech conversion system/model is configured to convert an input audio waveform or spectrograms corresponding to the atypical speech directly into an output audio waveform or spectrograms corresponding to the canonical fluent speech without convening the input audio waveform into an intermediate representation (e.g., text or phonemes). As will become apparent, speech conversion models, as well as techniques for training speech conversion models, will enable a user with atypical speech to speak to, and be understood by, both other humans and speech interfaces (e.g., digital assistants) by enabling recognition and/or reproduction of the user's intended speech.

One challenge in developing deep learning-based speech conversion models and ASR models is that parameters of these models tend to over fit the training data, thereby resulting in difficulties generalizing unseen data when the training data is not extensive enough. While training speech conversion models and ASR models on larger training datasets improves accuracy, there is a lack of training data that provides both linguistic diversity and acoustic diversity sufficient for personalization toward a target speaker having atypical speech and in a specific target domain. For instance, to attain training data with sufficient acoustic diversity, the target speaker having the atypical speech would have to record hours of spoken utterances each paired with a corresponding transcription. Moreover, attaining sufficient linguistic diversity for the specific target domain would require the utterances recorded from the speaker to include terms associated with the specific target domain. For example, the specific target domain may include, without limitation, an occupational field (e.g., a retina specialized physician), an education discipline (e.g., a lecturer on psychology), music, navigation, or weather. The specific target domain could similarly be a personalized domain associated with the target speaker, in which specific terms associated with the personalized domain could include names of family members, contact names, music artist/album/songs in a music library associated with the target speaker, etc.

Text-to-speech (TTS) or speech syntheses systems have successfully applied Seq2Seq models to obtain state of the art natural, realistic sounding synthesized speech that can be indistinguishable to the human ear from human speech. Advantageously, unspoken text utterances, or text-only data, can be easily and cheaply obtained to produce synthesized speech for improving training of speech conversion models. For instance, not only can unspoken text utterances be used to increase the volume of training data sets, but the unspoken text utterances can increase linguistic diversity in the training data without the difficulty of having to obtain transcribed speech (e.g., human spoken audio and corresponding transcriptions).

Implementations herein are directed toward improving training data used for training a speech conversion model (i.e., ASR or speech-to-speech conversion) personalized for a target speaker with atypical speech and targeting a specific domain of interest for the target speaker. Specifically, implementations include sampling initial personalized seed data corresponding to transcribed acoustic data of recorded utterances spoken by the target speaker with atypical speech and using the sampled seed data to adapt/tune a baseline text-to-speech (TTS) model. Here, the "baseline TTS model" simply refers to a reference/existing TTS model previously trained to convert input text into synthesized canonical speech in the voice of one or more predefined speakers. Here, the personalized seed data sampled from the target speaker tunes/adapt the baseline TTS model to convert input text into output synthesized speech in the voice of the target speaker and having the atypical speech pattern of the target speaker. The pre-trained baseline TTS model includes an encoder portion and a decoder portion, whereby adapting the TTS model may include tuning/re-training parameters of the decoder portion while parameters of the encoder portion remain fixed. By using the personalized seed data to adapt the TTS model in this manner, the adapted TTS model may be used to convert text utterances, including terms or phrases associated with the specific domain, into synthetic training utterances that include synthesized speech in the voice of the target speaker and having the associated atypical speech patterns of the target speaker. As will become apparent, the adapted TTS model may generate a multitude of synthetic training utterances that target the specific domain and with atypical speech in the voice (i.e., synthesized voice) of the target speaker to increase both linguistic diversity and acoustic diversity in training the speech conversion model.

The synthetic training utterances produced by the adapted TTS model and corresponding transcriptions are used to adapt/tune a baseline speech conversion model. Here, a "baseline speech conversion model" refers to either a reference/existing ASR model, pre-trained on a general corpus of transcribed acoustic data to recognize typical/canonical speech, or a reference/existing speech-to-speech conversion model, trained to map input audio waveforms (or spectrograms) for each of a plurality of utterances from a corpus spanning a variety of speakers and recording conditions to corresponding output audio waveforms (or spectrograms) in a voice of a predefined canonical speaker. Accordingly, the synthetic training utterances provide linguistic diversity and acoustic diversity sufficient for adapting/tuning the general speech conversion model to recognize and/or convert atypical speech spoken by the target speaker, and targeting a specific domain, into canonical text and/or canonical fluent synthesized speech. In these implementations, the sampled seed data corresponding to the transcribed acoustic data of recorded utterances spoken by the target speaker may be further used to adapt/tune the baseline speech conversion model. In other implementations, a combination of the synthetic training utterances produced by the adapted TTS model and the sampled seed data are used to train a speech conversional model from scratch.

FIG. 1A illustrates a speech conversion model 300, 300a configured to convert input audio data 102 corresponding to an utterance 108 spoken by a target speaker 104 associated with atypical speech into output audio data 106 corresponding to a synthesized canonical fluent speech representation of the same utterance 114 spoken by the target speaker 104. An associated speech conversion model 300 of the speech conversion system 100a includes a speech-to-speech (S2S) conversion model 300a configured to convert the input audio data 102 (e.g., input spectrogram) directly into the output audio data 106 (e.g., output spectrogram) without performing speech recognition, or otherwise without requiring the generation of any intermediate discrete representations (e.g., text or phonemes) from the input audio data 102. The S2S conversion model 300a includes a spectrogram encoder 310 configured to encode the input audio data 102 into a hidden feature representation (e.g., a series of vectors) and a spectrogram decoder 320 configured to decode the hidden representation into the output audio data 106 corresponding to the synthesized canonical fluent speech representation. For instance, as the spectrogram encoder 310 receives the input audio data 102 of the utterance 108, the spectrogram encoder 310 may process five frames of audio and convert those five frames of audio to ten vectors. The vectors are not a transcription of the frames of audio data 102, but rather a mathematical representation of the frames of the audio data 102. In turn, the spectrogram decoder 320 may generate the output audio data 106 corresponding to the synthesized canonical fluent speech representation based on the vectors received from the spectrogram encoder 310. For example, the spectrogram decoder 320 may receive the ten vectors from the spectrogram encoder 310 that represent the five frames of audio. Here, the spectrogram decoder 320 may generate five frames of output audio data 106 corresponding to the synthesized canonical fluent speech representation of the utterance 114 that includes the intended words or parts of words as the five frames of the input audio data 102, but without the disfluencies of the atypical speech.

In some examples, the S2S conversion model 300a also includes a text decoder (FIG. 2D) 250 that decodes the hidden representation into a textual representation, e.g., phonemes or graphemes. In these examples, the spectrogram decoder 320 and the text decoder 250 may correspond to parallel decoding branches of the S2S conversion model 300a that each receive the hidden representation encoded by the spectrogram encoder 310 and emit their respective one of the output audio data 106 or the textual representation in parallel. The S2S conversion system 100a may further include a synthesizer 375 to synthesize the output audio data 106 into a time-domain waveform for audible output as a same utterance 114 of fluent canonical fluent speech. A time-domain audio waveform includes an audio waveform that defines an amplitude of an audio signal over time. The synthesizer 375 may include a unit selection module or a WaveNet module for synthesizing the output audio data 106 into time-domain waveforms of synthesized canonical fluent speech. In some implementations, the synthesizer 375 includes a vocoder network, i.e., neural vocoder, that is separately trained and conditioned on mel-frequency spectrograms for conversion into time-domain audio waveforms.

In the example shown, the target speaker 104 is associated with atypical speech such that the target speaker 104 speaks with an atypical speech pattern that may be difficult to understand. Atypical speech patterns may include, without limitation, impaired speech due to physical or neurological conditions (e.g., speakers with Amyotrophic Lateral Sclerosis (ALS) disease), heavily-accented speech, and deaf speech. By way of example, the target speaker 104 has ALS disease and is associated with atypical speech due to ALS disease. The speech-to-speech conversion system 100a is accordingly trained to covert the input audio data 102 corresponding to utterances 108 spoken by the target speaker 104 associated with ALS speech directly into the output audio data 106 corresponding to the synthesized canonical fluent speech representation of the same utterance 108. Thus, the synthesized canonical fluent speech representation provided by the output audio data 106 improves intelligibility of the ALS speech spoken by the targets speaker 104. Without departing from the scope of the present disclosure, the S2S conversion model 300a may be trained to convert input audio data 102 corresponding to utterances 108 associated with atypical speech in a first language directly into output audio data 106 corresponding to a synthesized canonical fluent speech representation of the same utterance 108 in the same voice, but in a different second language.

A computing device 110 associated with the target speaker 104 may capture the utterance 108 spoken by the target speaker 104 and transmit the corresponding input audio data 102 to the speech-to-speech conversion system 100a for conversion into the output audio data 106. Thereafter, the speech-to-speech conversion system 100a may transmit the output audio data 106 corresponding to the synthesized canonical fluent speech representation of the same utterance 114 spoken by the target speaker 104 to another computing device 116 associated with user 118, whereby the other computing device 116 audibly outputs the synthesized canonical fluent speech representation of the utterance 108 spoken by the target speaker 104. In this example, the target speaker 104 and the user 118 are speaking with each other through their respective computing devices 110, 116, such as over a telephone call or other type of voice communication protocol, for example, voice over internet protocol. While the target speaker 104 and the other user 118 may speak the same language, it may be difficult for the other user 118 to understand the target speaker 104 because the target speaker 104 has atypical speech due to ALS disease. Thus, while the target speaker 104 speaks with atypical speech (e.g., ALS speech) that may be difficult to understand, the other user 118 hearing the synthesized canonical fluent speech representation will have an easier time understanding the utterance 108 intended by the target speaker 104. Stated differently, the synthesized canonical fluent speech representation provides a more consistent cadence that may be easier for another user to understand than the original utterance 108 spoken by the target speaker with the atypical speech. Notably, the synthesized canonical fluent speech representation is in the voice of the target speaker 104.

In some other examples, the S2S conversion system 100a may instead pass the output audio data 106 corresponding to the synthesized canonical fluent speech representation of the utterance spoken by the target speaker 104 to an output audio device for audibly outputting the synthesized canonical fluent speech representation in the voice of the target speaker 104 to an audience. For instance, the target speaker 104 may be a psychology professor providing a lecture to a class of students, in which utterances spoken by the target speaker 104 include medical terminology belonging to a particular specific domain, e.g., psychology. As will become apparent, the speech-to-speech conversion model 300a is trained to learn linguistic diversity associated with particular domains, as well as to learn acoustic diversity associated with particular types of atypical speech associated with target speakers 104.

Alternatively, the other computing device 116 may be associated with down-stream automated speech recognition (ASR) system in which the speech-to-speech conversion system 100a functions as a front-end to provide the output audio data 106 corresponding to the synthesized canonical fluent speech representation as an input to the ASR system for conversion into recognized text. The recognized text could be presented to the other user 118 and/or could be provided to a natural language understanding (NLU) system for further processing. The functionality of the speech-to-speech conversion system 100a can reside on a remote server 112, on either or both of the computing devices 110, 116, or any combination of the remote server and computing devices 110, 116. In some implementations, the S2S conversion model 300a continuously generates output audio data 106 corresponding to synthesized canonical fluent speech representations of an utterance as the target speaker 104 speaks corresponding portions of the utterance as atypical speech. By continuously generating output audio data 106 corresponding to synthesized canonical fluent speech representations of portions of the utterance 108 spoken by the target speaker 104, the conversation between the target speaker 104 and the user 118 (or audience) may be more naturally paced. In some additional implementations, the S2S conversion model 300a waits to determine/detect when the target speaker 104 stops speaking, using techniques such as voice activity detection, end pointing, end of query detection, etc., and before converting the corresponding input audio data 102 of the utterance 108 with atypical speech into the corresponding output audio data 106 corresponding to synthesized canonical fluent speech representation of the same utterance 114.

Figure 1B:
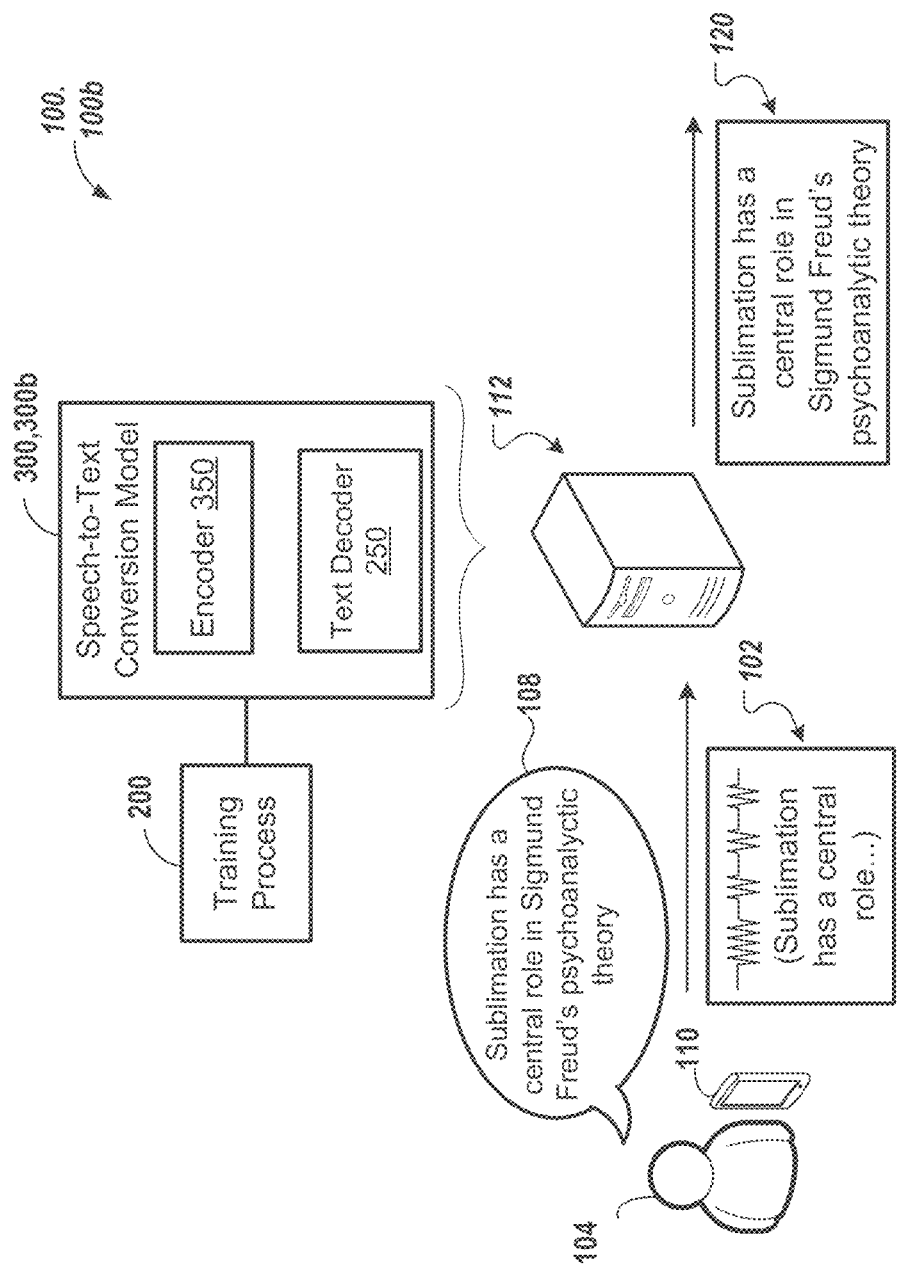
FIG. 1B is a schematic view of an example speech conversion system including a speech-to-text conversion model.

Referring now to FIG. 1B, in some implementations, the speech conversion system 100, 100b includes a speech-to-text conversion system 100b configured to convert the input audio data 102 corresponding to the utterance 108 spoken by the target speaker 104 associated with the atypical speech into a canonical textual representation (i.e., a transcription) 120 of the utterance 108. As with the S2S conversion system 100a of FIG. 1A, the speech-to-text conversion system 100b is not only configured to recognize the particular type of atypical speech (e.g., ALS speech) associated with the target speaker 104, but also recognize particular words and/or phrases associated with a particular domain. These particular words and/or phrases may include proper nouns or other terminology that is generally not present, or insufficiently represented, in a general training corpus used to train a general/baseline speech-to-text system.

Accordingly, the speech-to-text conversion system 100b may correspond to a personalized automated speech recognition (ASR) system for the target speaker 104 that can recognize the target speaker's particular type of atypical speech patterns, as well as linguistic information for a particular domain, for conversion into a corresponding canonical textual representation 120 that captures the intent of the original utterance 108 spoken by the target speaker 104 associated with the atypical speech. Another user 118 (FIG. 1A) may obtain the canonical textual representation 120 of the utterance 108. In some configurations, the canonical textual representation 120 output from the system 100b is processed, e.g., by a natural language understanding (NLU) module executing on the user device 110 or the remote server 112, to execute a user command. Additionally or alternatively, a text-to-speech system (e.g., executing on any combination of the user device 110 or the remote server 112) may convert the transcription into synthesized speech for audible output by another device. The functionality of the speech-to-text conversion system 100b can reside on the remote server 112, on either or both of the computing device 110, or any combination of the remote server 112 and computing device 110.

A speech conversion model 300 associated speech-to-text conversion system 100b may include a speech-to-text conversion model 300b (interchangeably referred to as an automated speech recognition (ASR) model 300b) configured to perform speech recognition on the utterance 108 of atypical speech by converting the input audio data 102 into the canonical textual representation (i.e., transcription) 120 of the utterance 108. The S2S conversion model 300a includes an encoder 350 configured to encode the input audio data 102 into a hidden feature representation (e.g., a series of vectors) and a text decoder 250 configured to decode the hidden representation into the canonical transcription 120. For instance, as the text encoder 350 receives the input audio data 102 of the utterance 108, the encoder 350 may process five frames of audio and convert those five frames of audio to ten vectors. The vectors are not a transcription of the frames of audio data 102, but rather a mathematical representation of the frames of the audio data 102. In turn, the text decoder 250 may generate the canonical transcription 120 based on the vectors received from the encoder 350. For example, the text decoder 250 may generate a sequence of words corresponding to the canonical transcription 120 of the utterance 180 that includes the intended words or parts of words in the five frames of the input audio data 102. Without departing from the scope of the present disclosure, the ASR model 300b may be trained to convert input audio data 102 corresponding to utterances 108 associated with atypical speech in a first language into a corresponding canonical transcription of the utterance 108 a different second language.

Referring to FIGS. 1A and 1B, the speech conversion system 100 executes a training process 200 configured to train the speech conversion model 300, i.e., the S2S conversion model 300a of FIG. 1A and/or the speech-to-text conversion model 300b of FIG. 1B. As will be described in greater detail below with reference to FIGS. 2A-2E, the training process 200 includes a personalized seed data collection stage 200a (FIG. 2A), a data generation stage 200b (FIG. 2B), an adaption stage 200c (FIG. 2C), a validation and filtering stage 200d (FIG. 2D), and final training stage 200e (FIG. 2E).

Figure 2A:
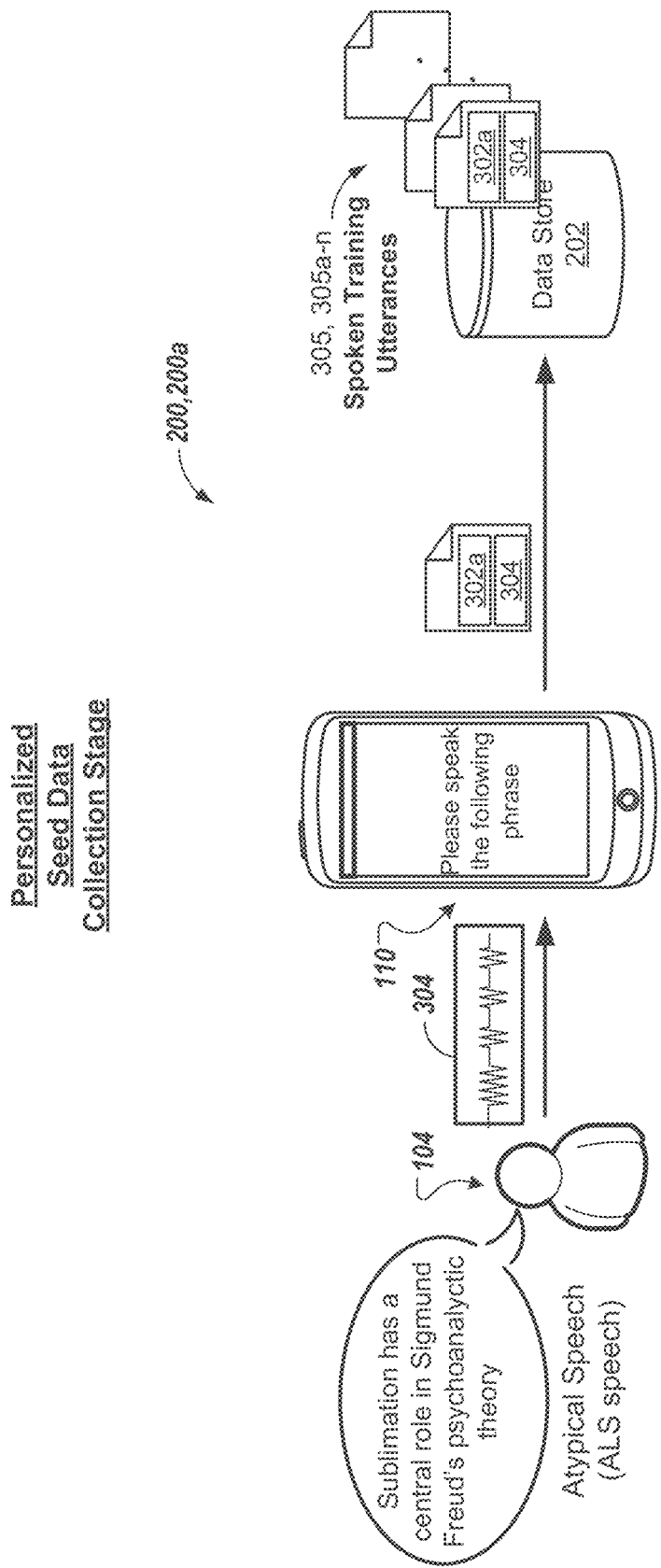
FIG. 2A is a schematic view of a personalized seed data collection stage for obtaining a set of spoken training utterances spoken by a target speaker.

Referring to FIG. 2A, the personalized seed data collection stage 200a of the training process 200 includes obtaining a set of spoken training utterances 305, 305a-n for the target speaker 104 associated with atypical speech. Here, each spoken training utterance 305 is spoken by the target speaker 104 and includes a corresponding transcription 302a paired with a corresponding non-synthetic speech representation 304 of the corresponding spoken training utterance 305. As such, the non-synthetic speech representation 304 is in a voice of the target speaker 104 and includes the atypical speech patterns for the type of atypical speech (e.g., ALS speech) associated with the target speaker 104. The transcription 302a in the set of spoken training utterances 305 may form a first portion of a plurality of training text utterances 302. Each transcription 302a may be a canonical transcription in the native speaking language of the target speaker 104. In some examples, some or all of the spoken training utterances 305 include words and/or phrases pertaining to a specific domain in which the speech conversion model 300 is trained to learn.

Figure 4:
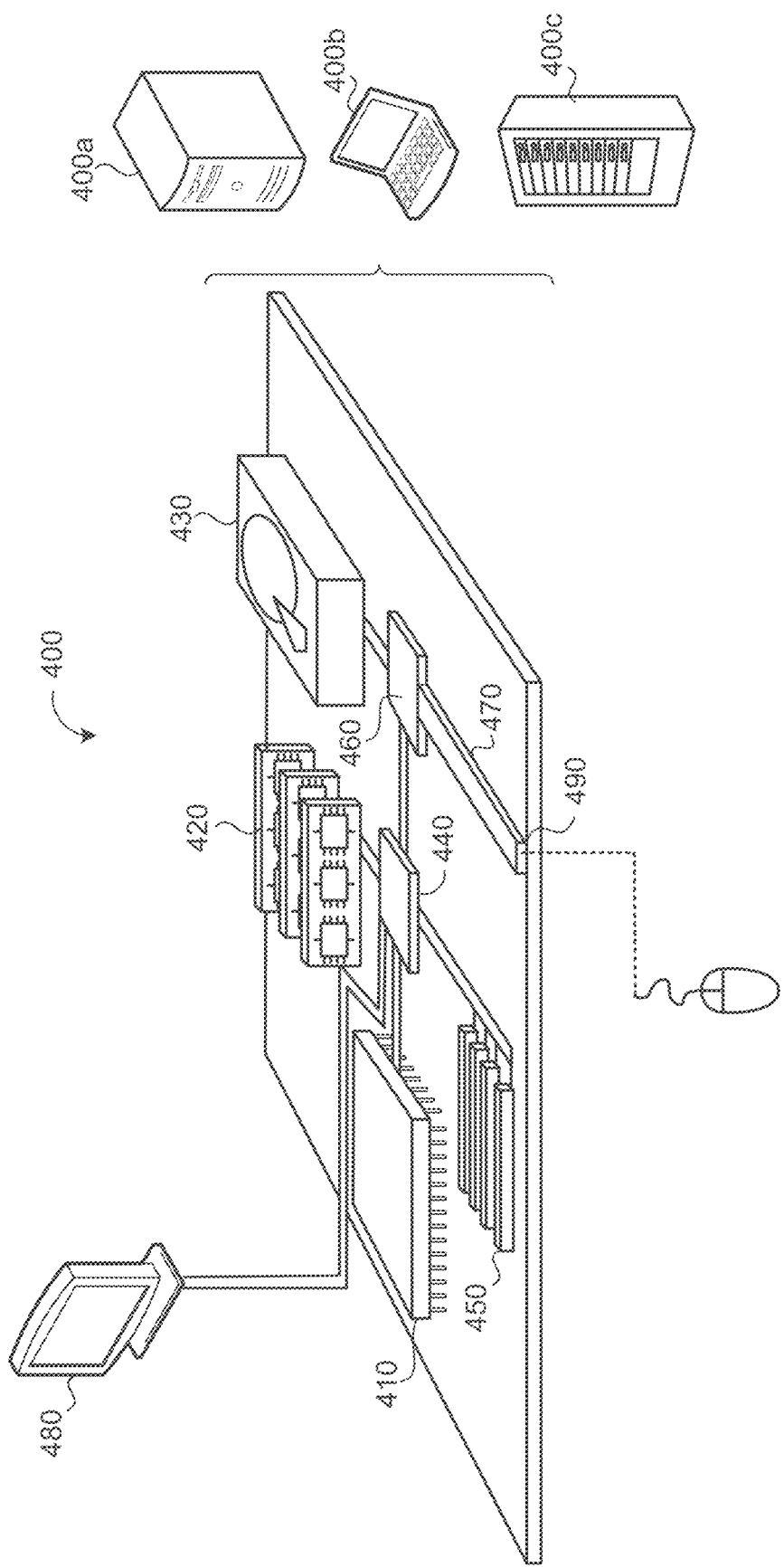
FIG. 4 is a schematic view of an example computing device that may be used to implement the systems and methods described herein.

In some implementations, the personalized seed data collection stage 200a prompts the target speaker 104 to speak each spoken training utterance 305 and records the utterance to obtain the corresponding non-synthetic speech representation 304. Each non-synthetic speech representation 304 obtained for the target speaker 104 may be paired with the corresponding transcription 302a of the spoken training utterance 305. As such, each spoken training utterance 305 includes manually-transcribed acoustic data 302a, 304 spoken by the target speaker 104. In the example shown, the personalized seed data collection stage 200a prompts the user to speak each spoken training utterance 305 by displaying the corresponding transcription 302a on a graphical user interface of the computing device 110 associated with the target speaker 104. This may include a separate prompt for each spoken training utterance, or may include prompting the target speaker to speak any number of consecutive spoken training utterances at a time. Additionally or alternatively, the computing device 110 may audibly output a prompt for the target speaker to speak each training utterance (e.g., "Please speak the following phrase". The set of spoken training utterances 305 may be stored in a data store 202 overlain on memory hardware 420 (FIG. 4). In some examples, the personalized seed data collection stage 200a collects about five-hundred (500) spoken training utterances 305.

Figure 2B:
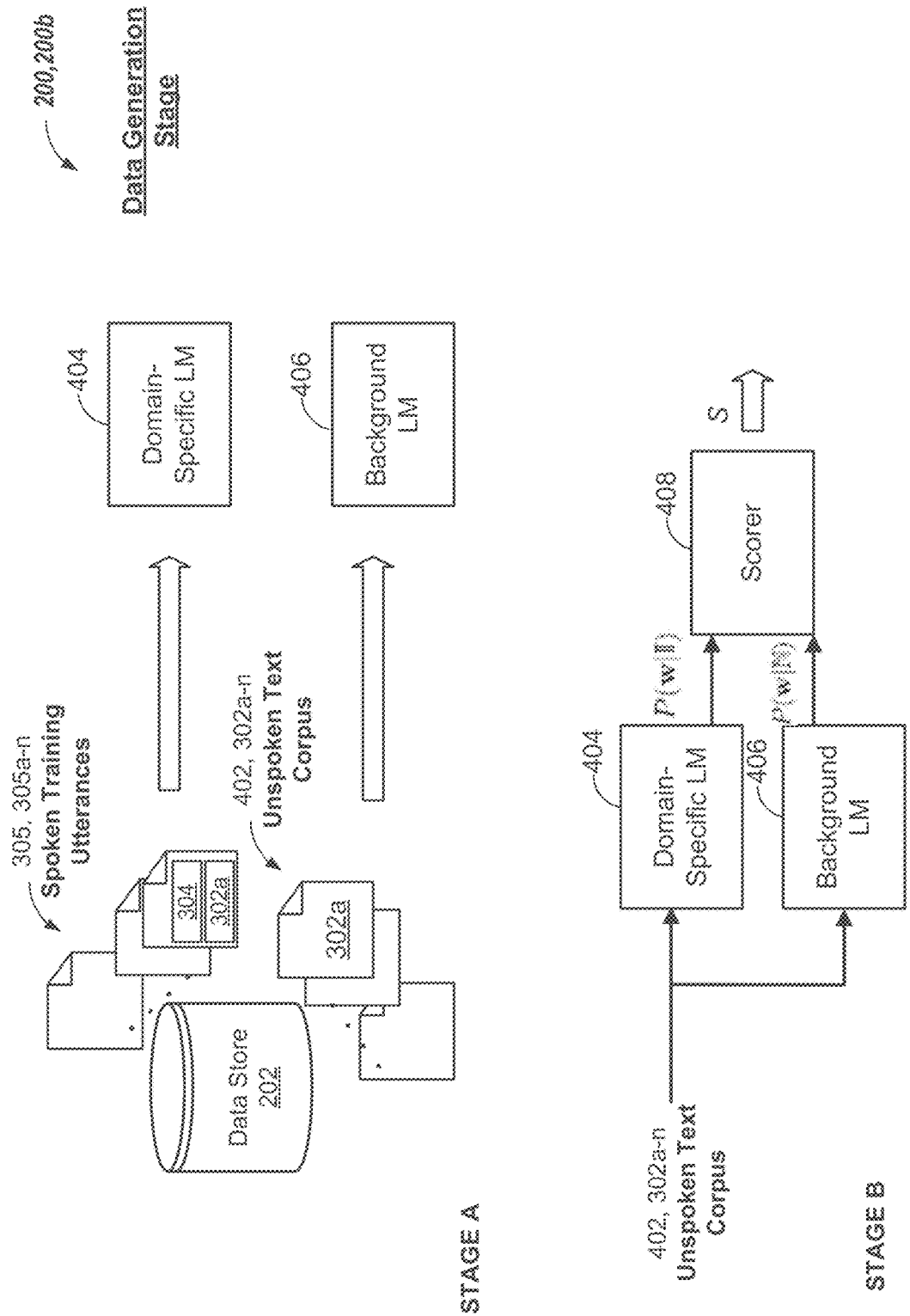
FIG. 2B is a schematic view of a data generation stage for obtaining a plurality of unspoken training text utterances.

Referring to FIG. 2B, the data generation stage 200b of the training process 200 includes obtaining a plurality of unspoken training text utterances 302b pertaining to the specific domain in which the speech conversion model 300 is being trained to learn. For example, the target speaker 104 may be a psychology professor such that the specific domain includes psychology terminology for college-level psychology courses. Each unspoken training text utterance 302b is not paired with any corresponding spoken utterance. The plurality of unspoken training text utterances 302b may form a second portion of the plurality of training text utterances 302.

In some implementations, the data generation stage 200b is configured to select the unspoken training text utterances 302b from a corpus of unspoken text 402. The corpus of unspoken text 402 includes a multitude of unspoken training text utterances 302b from across a large range of domains, and includes a far greater linguistic diversity than the specific domain in which the speech conversion model 300 is being trained to learn. As mentioned previously, the set of spoken training utterances 305 may be domain-specific in that they pertain to the specific domain. The corpus of unspoken text 402 may be stored in the same or different data store 202 as the spoken training utterances 305. The corpus of unspoken text 402 may dynamically change to incorporate new unspoken training text utterances 302b. Simply using all unspoken training text utterances 302b in the unspoken text corpus 402 is not feasible for the following reasons: i) for each sentence, the speech modality needs much more memory to be encoded than text, thereby making converting all text in the corpus 402 impractical; ii) conversion between speech and text modalities in TTS inference and speech conversion model training also requires large computation; and iii) the vast amount of difference between the transcriptions 302a in the spoken training utterances 305 and the unspoken training text utterances 302b in the unspoken text corpus 402 requires intelligent strategies to balance their contributions.

The data generation stage 200b aims to select a subset of the available unspoken training text utterances 302b from the unspoken text corpus 402 as the data for TTS synthesis described in greater detail below with reference to FIGS. 2D and 2E. Stated differently, the data generation stage 200b aims to improve the match between the selected subset of the available unspoken training text utterances 302b and the specific domain being targeted (e.g., Psychology terminology), which in turn reduces the computational resources required to exploit a large amount of non-domain-specific data. Accordingly, the data generation stage 200b reduces computational and memory costs by selecting unspoken training text utterances 302b that best match the specific domain the speech conversion model 300 is being trained to learn.

In some examples, the data generation stage 200b selects the subset of the available unspoken training text utterances 302b from the corpus 402 that best match the specific domain by simply providing a domain identifier (not shown) associated with the specific domain as an input to a background language model (LM) 406 previously trained on the entire unspoken text corpus 402. As mentioned previously, the unspoken text corpus 402 spans a multitude of different domains. In these examples, the background LM 406 may include a maximum entropy (MaxEnt LM) capable of optionally accepting the domain identifier as input as described in U.S. Pat. No. 9,842,592, filed on Feb. 12, 2014, the contents of which is incorporated herein by reference in its entirety. Here, the domain identifier associated with the specific domain may allow the MaxEnt LM to output a subset of the available unspoken training text utterances 302b from the corpus 402 that are likely to include words and/or phrases pertaining to the specific domain. In some configurations, rather than evaluating likelihood of words, a statistical language model operates in reverse mode to randomly generate a text phrase that matches a statistical distribution of words pertaining to the specific domain.

In additional examples, and as depicted in FIG. 2A, the data generation stage 200b executes an unspoken text selection process that uses the transcriptions 302a in the set of spoken training utterances 305 obtained from the target speaker 104 to select the subset of the available unspoken training text utterances 302b from the corpus 402 that best match the specific domain. Here, the spoken training utterances 305 spoken by the target speaker 104 include words, phrases, and/or other terminology pertaining to the specific domain. Optionally, in addition to, or in lieu of the transcriptions 302a in the set of spoken training utterances 305, a set of different transcribed utterances that pertain to the specific domain can be used for selecting the unspoken training text utterances 302b. This would provide the advantage of not requiring all the spoken training utterances 305 to belong to the specific domain.

During a first stage (STAGE A) of the unspoken text selection process, the data generation stage 200b builds two language models 404, 406 to enable contrastive selection of the unspoken training text utterances 302b Here, a domain-specific language model (LM) 410 is trained on each transcription 302a in the set of spoken training utterances 305. The set of spoken training utterances 305 are assumed to belong to the specific-domain for which the speech conversion model 300 is being trained. On the other hand, the background LM 406 is trained on each unspoken training text utterance 302b in the entire unspoken text corpus 402. As mentioned previously, the unspoken text corpus 402 spans a multitude of different domains. In some examples, the first stage uses n-gram language model training to build the two language models 404, 406. In other examples, the first stage uses neural network language model training to build the two language models 404, 406.

During a second state (STAGE B) of the unspoken text selection process, the data generation stage 200b uses the two contrastive LMs 404, 406 to evaluate each unspoken training text utterance 302b in the unspoken text corpus 402 by determining a first probability. P(w|𝕀), associated with each word in the unspoken training text utterance 302b appearing in the domain-specific LM 404 and determining a second probability, P(w|ℕ), associated with each word in the unspoken training text utterance 302b appearing in in the background LM 406. Thereafter, for each unspoken training text utterance 302b in the unspoken text corpus 402, the process 200 determines, at a scorer 408, a score, S, based on the first probability, the second probability, and a number of words, #(w), appearing in the corresponding unspoken training text utterance 302b. For example, the score S for each unspoken training text utterance 302b may be calculated as follows.

$$S = \frac{\log P(w|\mathbb{I}) - \log P(w|\mathbb{N})}{\#(w)} \quad (1)$$

After determining the scores, the data generation process 200b selects the unspoken training text utterances 302b with the N-best scores S as these unspoken training text utterances 302b best match the specific domain. The text corpus 402 may include billions of text utterances 302b. In lieu of, or in addition to, selecting from the available text corpus 402, the unspoken training text utterances 302b may include manually-written text not generated form a LM, to target certain phrases/improper nouns (e.g., family member names, contact names, games, etc.), and/or the unspoken training text utterances 302b may be derived from a particular topic of interest using a topic classifier associated with the specific domain. The unspoken training text utterances 302b generated during the data generation stage 200b can include millions of utterances, and thus, far exceed the number of spoken training utterances 305 collected from the speaker. As will become apparent, the content of the unspoken training text utterances 302b increases linguistic diversity for the specific domain the speech conversion model 300 is being trained to learn, while corresponding synthetic speech representations generated from the unspoken training text utterances 302b increases acoustic diversity for the atypical speech the speech conversion model 300 is converting.

Figure 2C:
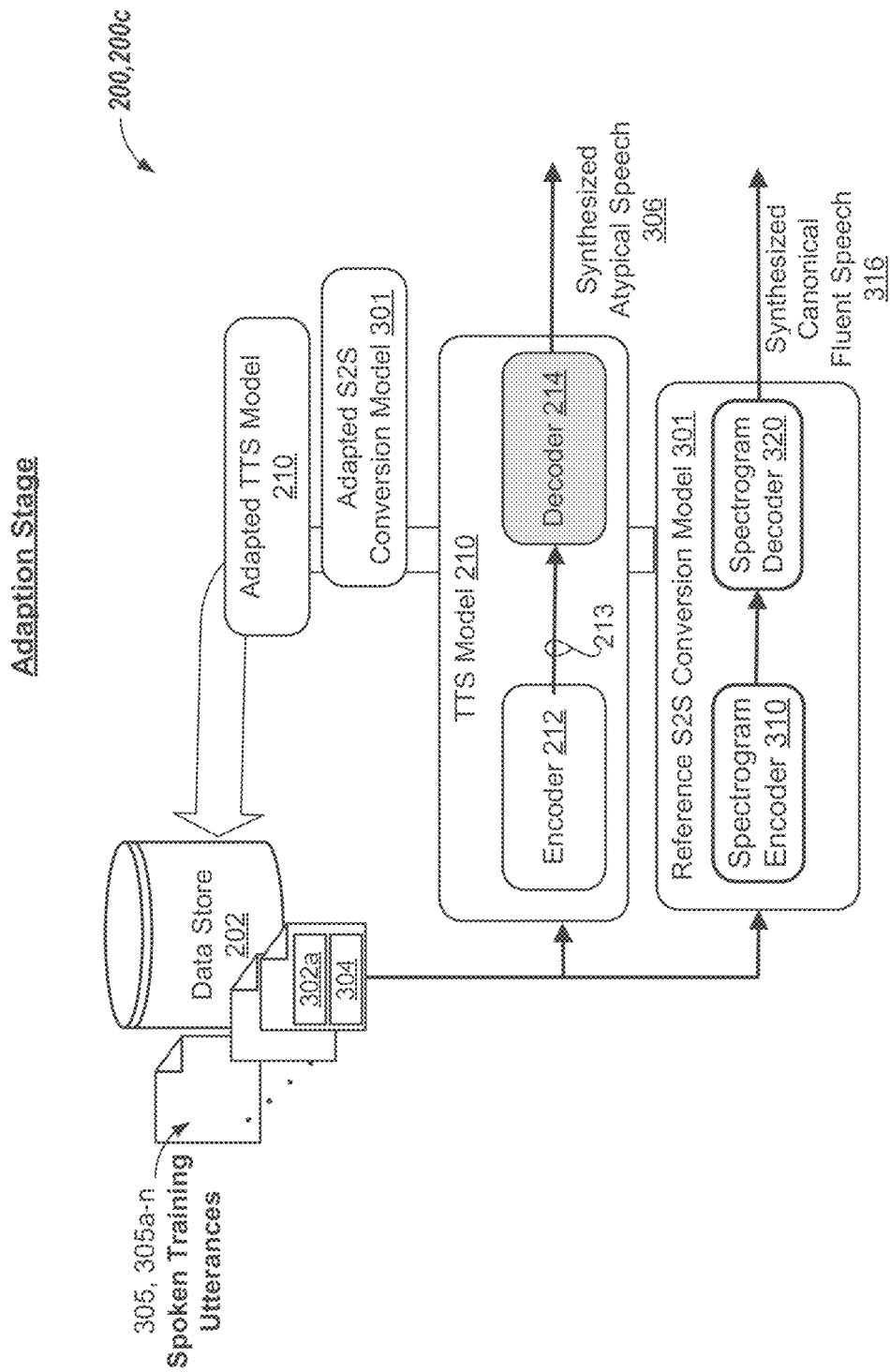
FIG. 2C is a schematic view of an adaption stage for adapting a reference text-to-speech (TTS) model and adapting a reference speech-to-speech conversion model.
Figure 2E:
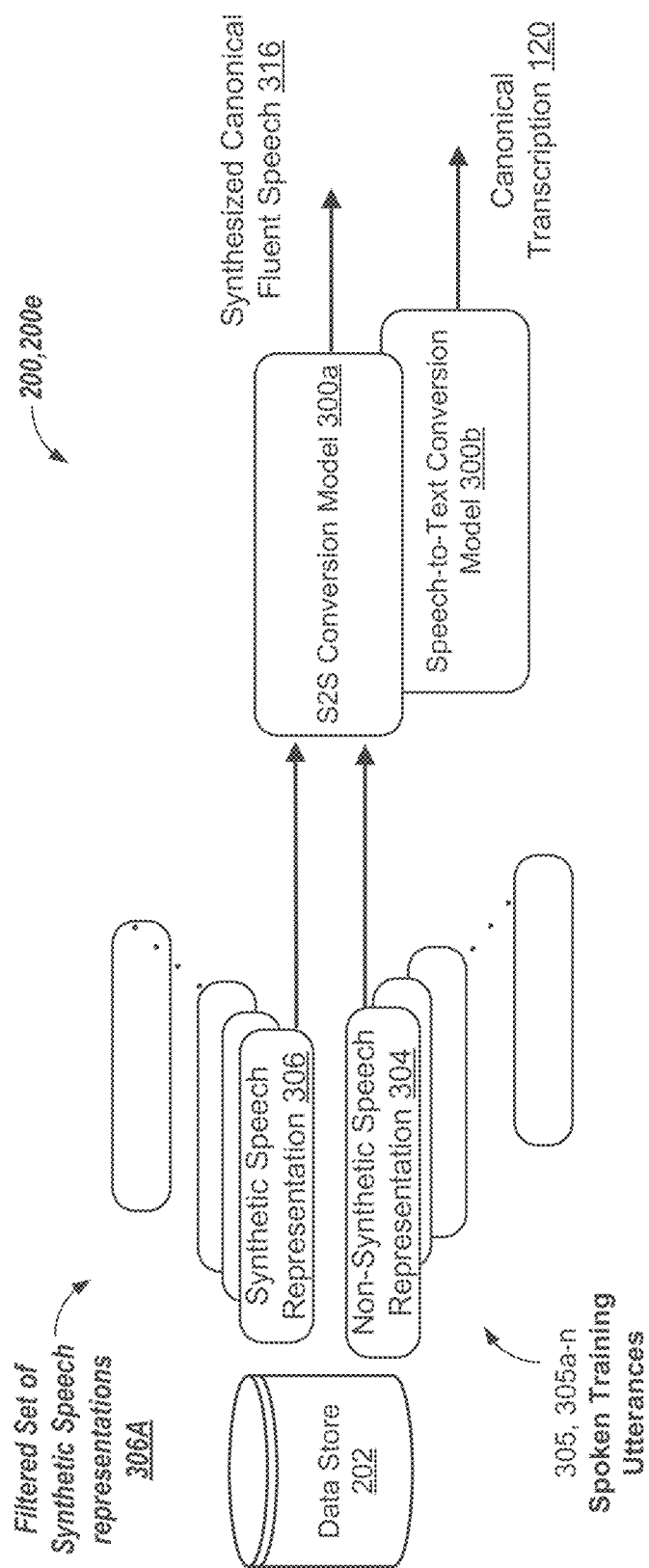
FIG. 2E is a schematic view of a final training stage for training a speech conversion model.

Referring to FIG. 2C, the adaption stage 200c of the training process 200 includes using the set of spoken training utterances 305 collected during the personalized seed data collection stage 200a of FIG. 2A to adapt both a text-to-speech (ITS) model 210 and a reference S2S conversion model 301 to synthesize speech in the voice of the target speaker 104 and that captures the atypical speech (e g. ALS speech) associated with the target speaker 104. The adaption stage 200c may occur before, after, or concurrently with the data generation stage 200b of FIG. 2B.

The TTS model 210 may be pre-trained on input text to generate synthesized canonical fluent speech in the voices of one or more predefined speakers. As such, ground-truth speech samples used to train the TTS model 210 may be obtained from speakers with typical speech.

Similarly, the reference S2S conversion model 301 is pre-trained on input audio data corresponding to a multitude of utterances spoken by various different speakers into corresponding output audio data that captures the same content in the voice of a single predefined speaker. Notably, the utterances from the various different speakers may include typical speech patterns, a variety of different types of atypical speech patterns (e.g., heavy accents spanning different dialects, irregular speech spanning different neurological conditions), as well as background noise. For example, the reference S2S conversion model 301 can include the end-to-end-trained speech-to-speech conversion model described in, *Parrotron: An End-to-End Speech-to-Speech Conversion Model and its Applications to Hearing-Impaired Speech and Speech Separation*, available at https://arxiv.org/pdf/1904.04169.pdf, and incorporated herein by reference. The reference S2S conversion model 301 can use a sequence-to-sequence to normalize arbitrary speech, potentially including background noise, and generate the same content in the voice of the single predefined target speaker. The source speech can be from any speaker or accent, and may contain complex prosodic patterns, imperfections, atypical speech, and background noise, all of which are removed through the normalization process as the first audio data is converted into clean second audio data with a fixed accent and consistent articulation and prosody. In other words, the system may be used to project away all non-linguistic information, including speaker characteristics, and to retain only what is been said, not who, how, or where it is said.

Since the TTS model 210 is pre-trained to generate synthesized canonical fluent speech in the voice other than the target speaker 104 and the reference S2S conversion model 301 is pre-trained on utterances from a variety of different speakers associated with both typical speech and various types of atypical speech, the adaption stage 200c aims to adapt the models 210, 301 to both the voice of the targets speaker 104 and the particular type of atypical speech (e g. ALS speech) associated with the target speaker 104. In some examples, however, when the reference S2S conversion model is pre-trained to convert input audio data associated with the particular type of atypical speech associated with the target speaker 104, the adaption stage 200c foregoes adapting the reference S2S conversion model 301 since the model 301 is already trained to convert the same type of atypical speech associated with the target speaker 104 into canonical fluent speech.

The adaption stage 200c adapts the TTS model 210 to convert the transcriptions 302a in the set of spoken training utterances 305 into corresponding synthetic speech 306 in the voice of the target speaker 104 and that captures the atypical speech associated with the target speaker 104. In some implementations, the TTS model 210 includes an encoder 312 and a decoder 314 that cooperate to process the transcriptions 302a to adapt the TTS model 210 to generate time-domain audio waveforms of synthesized speech 306 in the voice of the target speaker 104 and that captures the atypical speech associated with the target speaker 104. A time-domain audio waveform is an audio waveform that defines an audio signal's amplitude over time.

The encoder 212 may be an encoder neural network 212 configured to receive the transcription 304 as a sequence of characters and generate a fixed-length context vector 213 for each mel-frequency spectrogram that the decoder 214 will later generate. Since TTS model 210 is being adapted to produce synthesized speech capturing the atypical speech in the voice of the target speaker 104, the adaption stage 200c may include tuning/re-training parameters of the decoder 214 while parameters of the encoder 212 remain fixed. The decoder 214 may a neural network configured to receive, as input, the fixed-length context vectors 213 generated by the encoder neural network 212 and generate, as output for each fixed-length context vector 213, a corresponding frame of a mel-frequency spectrogram. A mel-frequency spectrogram is a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. The synthesized speech 306 may include a synthesized speech representation associated with the mel-frequency spectrograms output from the decoder 214, or the synthesized speech 306 may be a time-domain audio waveform generated by a vocoder (not shown) based on the mel-frequency spectrograms output from the decoder 214. The decoder 214 may include a post-net that may be adapted to the target speaker 104 by refining acoustic characteristics of the mel-frequency spectrograms generated by the decoder to better match the voice and atypical speech associated with the target speaker 104.

The adaption stage 200c adapts the reference S2S conversion model 301 to convert the non-synthetic speech representations 304 from the set spoken training utterances 305 into synthesized canonical fluent speech in the voice of the target speaker 104. As mentioned previously, the non-synthetic speech representations 304 are associated with the utterances spoken by the target speaker 104, and as such, capture the atypical speech associated with the target speaker 104. Here, the adaptation stage 200c may use the corresponding transcriptions 302a as a ground truth for the spectrogram decoder 320 to accurately decode/emit the synthesized canonical fluent speech 307 that conveys the intended content of the input non-synthetic speech representation 304.

Referring to FIG. 2D, for each unspoken training text utterance 302b of the plurality of unspoken training text utterances obtained during the data generation stage 200b of FIG. 2B, the validation and filtering stage 200d generates, as output from adapted TTS model 210, a synthetic speech representation 306 of the corresponding unspoken training text utterance 302b. Since the spoken training utterances 305 were used to adapt the TTS model 210, each synthetic speech representation 306 includes the voice of the target speaker and captures the atypical speech associated with the target speaker 104. As such, each synthetic speech representation 306 output from the adapted TTS model 210 is paired with a corresponding one of the plurality of unspoken training text utterances 302b.

In the example shown, the validation and filtering stage 200d further uses the adapted S2S conversion model 301 to generate, for each synthetic speech representation 306 output from the adapted TTS model 210, a corresponding audio waveform of synthesized canonical fluent speech 316 in the voice of the target speaker 104, and thereafter uses a text decoder 250 to generate a textual representation 318 for the corresponding audio waveform of synthesized canonical fluent speech 316 generated as output from the adapted S2S conversion model 301. As previously mentioned, if the reference S2S speech conversion model 301 is previously trained for converting the same type of atypical speech, the reference S2S speech conversion model 301 need not (but still could) be adapted prior to generating audio waveforms of synthesized canonical fluent speech from the synthetic speech representations 306. In some examples, the text decoder 250 resides on the adapted S2S speech conversion model 301 in which the S2S speech conversion model 301 emits the textual representation 318 from the text decoder 250 in parallel with emitting the corresponding audio waveform of synthesized canonical fluent speech 316 from the spectrogram decoder 320. In other examples, the text decoder 250 resides on a reference automated speech recognition model separate from the speech conversion model.

Thereafter, for each synthetic speech representation 306 output from the adapted TTS model 210, the validation and filtering stage 200d applies a supervised loss term module 340 to determine a word error rate loss 342 associated with the corresponding synthetic speech representation 306. Specifically, the word error rate loss 342 is based on the textual representation 318 output from text decoder 250 for the synthesized canonical fluent speech 306 and the corresponding unspoken training text utterance 302b. Notably, the unspoken training text utterance 302b serves as both an input to the adapted TTS model 210 for conversion into the resulting synthetic speech representation 306, and as a ground-truth for verifying the corresponding textual representation 318 output from the decoder 250. In the example shown, the validation and filtering stage 200d validates each synthetic speech representation 306 output from the adapted TTS model 210 by determining whether or not the corresponding word error rate loss 342 satisfies a word error rate loss threshold. When the corresponding word error rate loss 342 satisfies the word error rate loss threshold, the corresponding synthetic speech representation 306 is stored in a filtered set of synthetic speech representations 306A for use in training the speech conversion model 300. When the corresponding word error rate loss 342 fails to satisfy the word error rate loss threshold, the corresponding synthetic speech representation 306 is discarded an not used to train the speech conversion model 300.

In the example shown, the supervised loss term module 340 determines the word error rate loss 342 based on the number of misrecognized words between the corresponding textual representation 318 and the corresponding unspoken training text utterance 302b serving as ground-truth. For example, a word error rate loss of 60% indicates that 40% of the words in the corresponding textual representation 318 were misrecognized by the text decoder 250 from the corresponding synthesized canonical fluent speech 316. The word error rate loss threshold can be set to any value, and may be adjusted as needed. In one example, the word error rate loss threshold is 70% indicating that at least 70% of the words in the corresponding textual representation 318 must be accurately recognized in order for the corresponding synthetic speech representation 306 to satisfy the word error rate loss threshold, and thus, be accepted in the filtered set of synthetic speech representations 306A. The word error rate loss 342 and value set for the word error rate loss threshold serve as a proxy for identifying only the synthetic speech representations 306 (i.e., the filtered set of synthetic speech representations 306A) that are suitable for training the speech conversion model 300, and discarding any synthetic speech representations 306 that are not suitable for training. The discarded synthetic speech representations 306 are indicative of input audio waveforms (or spectrograms) that the adapted S2S conversion model 301 is unable to accurately convert into intelligible synthesized canonical fluent speech 316 due to the text decoder 250 producing corresponding textual representations 318 with word error rate losses 342 that fail to satisfy the word error rate loss threshold. Simply put, the discarded synthetic speech representations 306 are associated with a small percentage of the total number of synthetic speech representations 306 generated by the adapted TTS model 210 that are indicative of being unintelligible or far from ideal in terms of quality of content and style.

While it is understood that the steps of using the adapted S2S conversion model 301 to produce synthesized canonical fluent speech 316 from each atypical synthetic speech representation 306 and applying speech recognition on the synthesized canonical fluent speech 316 by the text encoder 250 to produce the textual representation 318 help validate the synthetic speech representations 306 for training the speech conversion model 300, these steps may be optional. For instance, the adapted TTS model 210 may be used to generate a corresponding synthetic speech representation 306 for each unpaired unspoken training text utterance 302b, and all of the synthetic speech representations 306 may be used to train the speech conversion model 300 without applying the adapted S2S conversion model 301, the text decoder 250, and the supervised loss term module 340 to identify the filtered set of synthetic speech representations 306A.

Referring now to FIG. 2E, the final training stage 200e includes training the speech conversion model 300 based on the synthetic speech representation 306 generated by the adapted TTS model 210 for each unspoken training text utterance 302b of the plurality of unspoken training text utterances 302b. More specifically, the final training stage 200e of the training process 200 trains the speech conversion model 300 on the filtered set of synthetic speech representations 306A and not training the speech conversion model 300 on any of the synthetic speech representations 306 that have been discarded for having word error rate losses 342 not satisfying the word error rate loss threshold as discussed above in the validation and filtering stage 200d of FIG. 2D.

In some implementations, training the speech conversion model 300 includes training a S2S speech conversion model 300a personalized for the target speaker 104 to convert input audio waveforms associated with the atypical speech of the speaker directly into corresponding output waveforms of canonical fluent speech in the voice of the speaker. The number of synthetic speech representations 306A in the filtered set of synthetic speech representations 306A provides sufficient acoustic diversity for training the S2S speech conversion model 300a to learn both the voice of the target speaker 104 and the type of atypical speech associated with the target speaker 104. Moreover, since each synthetic speech representation 306 used to train the S2S conversion model 300a pertains to the specific domain, the number of synthetic speech representations 306A in the filtered set of synthetic speech representations 306A also provides sufficient linguistic diversity for training the S2S speech conversion model 300a to learn specific words, names, phrases, or other terminology associated with the specific domain that are like to be present in atypical speech utterances 108 spoken by the target speaker 104.

In some examples, training the S2S conversion model 300a includes adapting the reference S2S conversion model 301 (FIG. 2C) on the filtered set of synthetic speech representations 306A each paired with a corresponding one of the unspoken training text utterances 302b. As mentioned previously, the reference S2S conversion model 301 was previously trained using utterances spoken from a variety of different speakers with different speaking styles and different voices to produce canonical fluent speech in the voice of a predefined speaker. As such, adapting the reference S2S conversion model 301 on the filtered set of synthetic speech representations 306A provides the trained S2S conversion model 300a that is personalized for the target speaker 104 to convert any input audio waveform (e.g., input audio data 102 of FIG. 1A) corresponding to an utterance spoken by the target speaker 104 associated with the particular type of atypical speech into an output audio waveform (e.g., output audio data 106 of FIG. 1A) corresponding to a synthesized canonical fluent speech representation 316 of the same utterance spoken by the target speaker. In these examples, the trained S2S speech conversion model 300a may be further adapted/tuned on the non-synthetic speech representations 304 from the set of spoken training utterances 305 collected from the target speaker 104 during the personalized seed data collection stage 200a of FIG. 2A.

In other examples, training the S2S conversion model 300a includes training the S2S conversion model 300a from scratch. Training the S2S conversion model 300a from scratch may include training on a mixture of the filtered set of synthetic speech representations 306A, each paired with a corresponding one of the unspoken training text utterances 302b, and the non-synthetic speech representations 304 in the set of spoken training utterances 305, each paired with a corresponding transcription 302a. Here, the model 300 may be trained on corresponding batches of non-synthetic and synthetic speech representations 304, 306 in parallel such that the model 300a outputs corresponding synthesized canonical fluent speech representations 316 in parallel.

When training the S2S conversion model 300a, whether by adapting the reference S2S conversion model 301 or from scratch, the final training stage 200e of the training process 200 may use a stochastic optimization algorithm, such as stochastic gradient decent, to train the model 300a through backpropagation. For example, an automated speech recognizer (e.g., text decoder 250 of FIG. 2D) may produce a textual representation 318 for each corresponding synthesized canonical fluent speech representation 316 output from the S2S conversion model 300a that may be compared with the corresponding training text utterance 302a, 302b serving as ground truth to obtain a word error rate loss 342 (FIG. 2D). While the automated speech recognizer may be a separately trained automated speech recognizer, the automated speech recognizer may also include a text decoder of the S2S conversion model 300a that emits the textual representations 318 in parallel with the corresponding synthetic canonical fluent speech representations 318 emitted by the spectrogram decoder 320. Regardless from where the resulting textual representations 318 are produced, the stochastic optimization algorithm may use the word error rate losses 342 to define respective loss functions (e.g., cross-entropy loss functions) based on a difference between actual outputs (e.g., the textual representations 318) and target outputs (the transcriptions and unspoken training text utterances 302a, 302b). For example, the loss function may be computed for each batch of training examples, and then differentiated with respect to each weight in the model 300a.

In some additional implementations, training the speech conversion model 300 additionally or alternatively includes training a speech-to-text conversion model 300b (interchangeably referred to as 'ASR model') personalized for the target speaker 104 to convert input audio waveforms associated with the atypical speech of the speaker into corresponding text that includes canonical transcriptions 120 of utterances spoken by the target speaker 104. The number of synthetic speech representations 306A in the filtered set of synthetic speech representations 306A provides sufficient acoustic diversity for training the ASR model 300b to learn recognize utterances 108 spoken with the type of atypical speech associated with the target speaker 104. Moreover, since each synthetic speech representation 306 used to train the ASR model 300b pertains to the specific domain, the number of synthetic speech representations 306A in the filtered set of synthetic speech representations 306A also provides sufficient linguistic diversity for training the ASR model 300b to learn to recognize particular words, names, phrases, or other terminology associated with the specific domain that are like to be present in atypical speech utterances 108 spoken by the target speaker 104.

As with the S2S speech conversion model 300a, training the ASR model 300b may include adapting a reference ASR model 300b that was previously trained on a general corpus of training utterances spoken by a variety of different speakers with different speaking styles. Here, the reference ASR model 300b may be adapted on the filtered set of synthetic speech representations 306A each paired with a corresponding one of the unspoken training text utterances 302b, and then further adapted/tuned on the non-synthetic speech representations 304 from the set of spoken training utterances 305 collected from the target speaker 104 during the personalized seed data collection stage 200a of FIG. 2A. On the other hand, the ASR model 300b may be trained from scratch using a mixture of the filtered set of synthetic speech representations 306A, each paired with a corresponding one of the unspoken training text utterances 302b, and the non-synthetic speech representations 304 in the set of spoken training utterances 305, each paired with a corresponding transcription 302a.

In other examples, training the S2S conversion model 300a includes training the S2S conversion model 300a from scratch. Training the S2S conversion model 300a from scratch may include training on a mixture of the filtered set of synthetic speech representations 306A, each paired with a corresponding one of the unspoken training text utterances 302b, and the non-synthetic speech representations 304 in the set of spoken training utterances 305, each paired with a corresponding transcription 302a Here, the model 300 may be trained on corresponding batches of non-synthetic and synthetic speech representations 304, 306 in parallel such that the model 300a outputs corresponding synthesized canonical fluent speech representations 316 in parallel.

The final training stage 200e of the training process 200 may use a stochastic optimization algorithm, such as stochastic gradient decent, to train the ASR model 300b through backpropagation. Details of using the stochastic optimization algorithm for training the ASR model 300b are discussed above with respect to training the S2S conversion model 300a.

Figure 3:
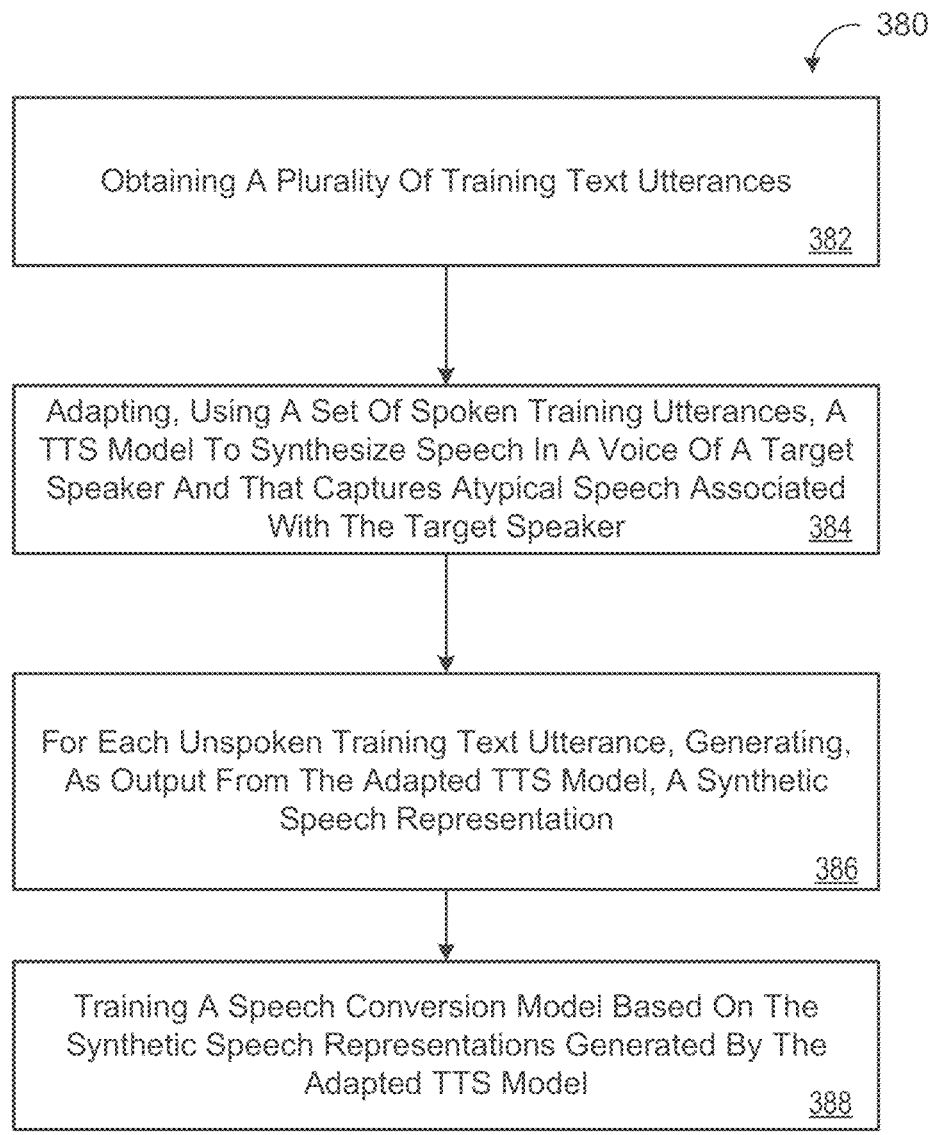
FIG. 3 is a flowchart of an example arrangement of operations for a method of training a speech conversion model.

FIG. 3 provides a flowchart of an example arrangement of operations for a method 380 of training a speech conversion model personalized for a target speaker associated with atypical speech. The flowchart may be described with respect to the training process 200 of FIGS. 1A, 1B, and FIGS. 2A-2E. Data processing hardware 410 (FIG. 4) may perform the operations for the method 380 by executing instructions stored on memory hardware 420 (FIG. 4) in communication with the data processing hardware 410. The data processing hardware 410 and the memory hardware 420 may reside on a computing device 400 (FIG. 400), such as a remote server 112 and/or the user computing device 110 of FIGS. 1A and 1B. At operation 382, the method 380 obtains a plurality of training text utterances 302a, 302b Here, a first portion of the plurality of training text utterances includes a plurality of transcriptions 302a in a set of spoken training utterances 305, 305a-n. Each spoken training utterance 305 is spoken by a target speaker 104 associated with atypical speech and includes a corresponding transcription 302a paired with a corresponding non-synthetic speech representation 304 of the corresponding spoken training utterance 305. The set of spoken training utterances 305 may be obtained during the personalized seed data collection stage 200a of FIG. 2A. A second portion of the plurality of training text utterances includes a plurality of unspoken training text utterances 302b pertaining to a specific domain in which the speech conversion model 300 is trained to learn. Each unspoken training text utterance 302b is not paired with any corresponding spoken utterance. The plurality of unspoken training text utterances 302b may be obtained during the data generation stage 200b of FIG. 2B.

At operation 384, the method 380 includes adapting, using the set of spoken training utterances 305, a text-to-speech (TTS) model 210 to synthesize speech in a voice of the target speaker and that captures the atypical speech associated with the target speaker. Details of adapting the TTS model 210 are described with reference to the adaption stage 200c of FIG. 2C.

At operation 386, for each unspoken training text utterance 302b of the plurality unspoken training text utterances, the method 380 also includes generating, as output from the adapted TTS model 210, a synthetic speech representation 306 of the corresponding unspoken training text utterance 302b. Here, each synthetic speech representation 306 output from the adapted TTS model 210 is in the voice of the target speaker 104 and captures the atypical speech associated with the target speaker 104. At operation 388, the method 380 also includes training the speech conversion model 300 based on the synthetic speech representation 306 generated by the adapted TTS model 210 for each unspoken training utterance 302b of the plurality of unspoken training text utterances. Training the speech conversion model 300 includes training at least one of a S2S conversion model 300a or a speech-to-text (e g, ASR) model 300b.

A software application (i.e., a software resource) may refer to computer software that causes a computing device to perform a task. In some examples, a software application may be referred to as an "application," an "app," or a "program" Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e g, program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of training a speech conversion model, the method comprising:
    obtaining, by data processing hardware, a plurality of training text utterances, wherein:
        a first portion of the plurality of training text utterances comprises a plurality of transcriptions in a set of spoken training utterances, each spoken training utterance spoken by a target speaker associated with atypical speech and comprising a corresponding transcription paired with a corresponding non-synthetic speech representation of the corresponding spoken training utterance; and
        a second portion of the plurality of training text utterances comprises a plurality of unspoken training text utterances pertaining to a specific domain in which the speech conversion model is trained to learn, each unspoken training text utterance not paired with any corresponding spoken utterance;
    adapting, by the data processing hardware, using the set of spoken training utterances, a text-to-speech (TTS)

model to synthesize speech in a voice of the target speaker and that captures the atypical speech associated with the target speaker, for each unspoken training text utterance of the plurality unspoken training text utterances, generating, by the data processing hardware, as output from the adapted TTS model, a synthetic speech representation of the corresponding unspoken training text utterance, the synthetic speech representation comprising the voice of the target speaker and capturing the atypical speech associated with the target speaker; and training, by the data processing hardware, the speech conversion model based on the synthetic speech representation generated by the adapted TTS model for each unspoken training text utterance of the plurality of unspoken training text utterances.

2. The method of claim 1, further comprising:

for each synthetic speech representation generated by the adapted TTS model:

generating, by the data processing hardware, as output from the speech conversion model, a corresponding audio waveform of synthesized canonical fluent speech in the voice of the target speaker;

generating, by the data processing hardware, as output from a text decoder, a textual representation for the corresponding audio waveform of synthesized canonical fluent speech generated as output from the speech conversion model; and determining, by the data processing hardware, a word error rate loss associated with the corresponding synthetic speech representation based on the textual representation generated as output from the text decoder for the corresponding audio waveform of synthesized canonical fluent speech and the corresponding unspoken training text utterance; and identifying, by the data processing hardware, a filtered set of synthetic speech representations each corresponding to a respective one of the synthetic speech representations generated as output from the speech conversion model that has a word error rate loss satisfying a word error rate loss threshold, wherein training the speech conversion model based on the synthetic speech representation generated by the adapted TTS model for each unspoken training text utterance of the plurality of unspoken training text utterances comprises training the speech conversion model on the filtered set of synthetic speech representations and not training the speech conversion model on any of the synthetic speech representations generated as output from the speech conversion model that have word error rate losses not satisfying the word error rate loss threshold.

3. The method of claim 2, further comprising, when the speech conversion model is not previously trained to convert audio waveforms of input utterances spoken by speakers having a same type of atypical speech as the atypical speech associated with the target speaker:

adapting, by the data processing hardware, using the set of spoken training utterances, the speech conversion model to convert audio waveforms of input utterances spoken by the target speaker with atypical speech into audio waveforms of synthesized canonical fluent speech, wherein generating the corresponding audio waveform of synthesized canonical fluent speech comprises generating, as output from the adapted speech conversation model, the corresponding audio waveform of synthesized canonical fluent speech in the voice of the target speaker.

4. The method of claim 2, wherein the text decoder resides on the speech conversion model.

5. The method of claim 2, wherein the text decoder resides on a reference automated speech recognition model separate from the speech conversion model.

6. The method of claim 1, wherein the speech conversion model comprises an end-to-end neural network configured to convert input audio waveforms directly into corresponding output audio waveforms.

7. The method of claim 6, further comprising, after training the speech conversion model:

receiving, at the data processing hardware, an input audio waveform corresponding to an utterance spoken by the target speaker associated with atypical speech; and converting, by the data processing hardware, using the trained speech conversion model, the input audio waveform corresponding to the utterance spoken by the target speaker associated with atypical speech into an output audio waveform corresponding to a synthesized canonical fluent speech representation of the utterance spoken by the target speaker.

8. The method of claim 1, wherein the speech conversion model comprises an automated speech recognition model configured to convert speech into corresponding text.

9. The method of claim 8, further comprising, after training the speech conversion model:

receiving, at the data processing hardware, audio data corresponding to an utterance spoken by the target speaker associated with atypical speech; and converting, by the data processing hardware, using the trained speech conversion model, the audio data corresponding to the utterance spoken by the target speaker associated with atypical speech into a canonical textual representation of the utterance spoken by the target speaker.

10. The method of claim 1, wherein at least a portion of the plurality of unspoken training text utterances in the second portion of the plurality of training text utterances comprise manually written text targeting particular phrases that pertain to the particular domain.

11. The method of claim 1, further comprising executing, by the data processing hardware, an unspoken text selection process to obtain the unspoken training text utterances in the second portion of the plurality of training text utterances, wherein the text selection process is configured to:

obtain a corpus of unspoken text utterances;

for each unspoken text utterance in the corpus of unspoken text utterances:

determine a first probability associated with the unspoken text utterance appearing in a domain-specific language model;

determine a second probability associated with the unspoken text utterance appearing in a background language model, the background language model trained on every unspoken text utterance in the corpus of unspoken text utterances; and determine a score based on the first probability, the second probability, and a number of words appearing in the corresponding unspoken text utterance, and select, as the unspoken training text utterances in the second portion of the plurality of training text utterances, the unspoken text utterances in the corpus of unspoken text utterances that have the N-best scores.

12. The method of claim 1, wherein
the TTS model comprises a pre-trained reference TTS model comprising an encoder portion and a decoder portion; and
adapting the TTS model comprises adapting the pre-trained reference TTS model by tuning parameters of the decoder portion while parameters of the encoder portion remain fixed.

13. A system comprising:
data processing hardware; and
memory hardware in communication with the data processing hardware, the memory hardware storing instructions that when executed on the data processing hardware cause the data processing hardware to perform operations comprising:
obtaining a plurality of training text utterances, wherein a first portion of the plurality of training text utterances comprises a plurality of transcriptions in a set of spoken training utterances, each spoken training utterance spoken by a target speaker associated with atypical speech and comprising a corresponding transcription paired with a corresponding non-synthetic speech representation of the corresponding spoken training utterance; and
a second portion of the plurality of training text utterances comprises a plurality of unspoken training text utterances pertaining to a specific domain in which the speech conversion model is trained to learn, each unspoken training text utterance not paired with any corresponding spoken utterance;
adapting, using the set of spoken training utterances, a text-to-speech (TTS) model to synthesize speech in a voice of the target speaker and that captures the atypical speech associated with the target speaker;
for each unspoken training text utterance of the plurality unspoken training text utterances, generating, as output from the adapted TTS model, a synthetic speech representation of the corresponding unspoken training text utterance, the synthetic speech representation comprising the voice of the target speaker and capturing the atypical speech associated with the target speaker; and
training the speech conversion model based on the synthetic speech representation generated by the adapted TTS model for each unspoken training text utterance of the plurality of unspoken training text utterances.

14. The system of claim 13, wherein the operations further comprise:
for each synthetic speech representation generated by the adapted TTS model:
generating, as output from the speech conversion model, a corresponding audio waveform of synthesized canonical fluent speech in the voice of the target speaker;
generating, as output from a text decoder, a textual representation for the corresponding audio waveform of synthesized canonical fluent speech generated as output from the speech conversion model; and
determining a word error rate loss associated with the corresponding synthetic speech representation based on the textual representation generated as output from the text decoder for the corresponding audio waveform of synthesized canonical fluent speech and the corresponding unspoken training text utterance; and
identifying a filtered set of synthetic speech representations each corresponding to a respective one of the synthetic speech representations generated as output from the speech conversion model that has a word error rate loss satisfying a word error rate loss threshold,
wherein training the speech conversion model based on the synthetic speech representation generated by the adapted TTS model for each unspoken training text utterance of the plurality of unspoken training text utterances comprises training the speech conversion model on the filtered set of synthetic speech representations and not training the speech conversion model on any of the synthetic speech representations generated as output from the speech conversion model that have word error rate losses not satisfying the word error rate loss threshold.

15. The system of claim 14, wherein the operations further comprise, when the speech conversion model is not previously trained to convert audio waveforms of input utterances spoken by speakers having a same type of atypical speech as the atypical speech associated with the target speaker:
adapting, using the set of spoken training utterances, the speech conversion model to convert audio waveforms of input utterances spoken by the target speaker with atypical speech into audio waveforms of synthesized canonical fluent speech,
wherein generating the corresponding audio waveform of synthesized canonical fluent speech comprises generating, as output from the adapted speech conversation model, the corresponding audio waveform of synthesized canonical fluent speech in the voice of the target speaker.

16. The system of claim 14, wherein the text decoder resides on the speech conversion model.

17. The system of claim 14, wherein the text decoder resides on a reference automated speech recognition model separate from the speech conversion model.

18. The system of claim 13, wherein the speech conversion model comprises an end-to-end neural network configured to convert input audio waveforms directly into corresponding output audio waveforms.

19. The system of claim 18, wherein the operations further comprise, after training the speech conversion model:
receiving an input audio waveform corresponding to an utterance spoken by the target speaker associated with atypical speech; and
converting, using the trained speech conversion model, the input audio waveform corresponding to the utterance spoken by the target speaker associated with atypical speech into an output audio waveform corresponding to a synthesized canonical fluent speech representation of the utterance spoken by the target speaker.

20. The system of claim 13, wherein the speech conversion model comprises an automated speech recognition model configured to convert speech into corresponding text.

21. The system of claim 20, wherein the operations further comprise, after training the speech conversion model:
receiving audio data corresponding to an utterance spoken by the target speaker associated with atypical speech; and
converting, using the trained speech conversion model, the audio data corresponding to the utterance spoken by the target speaker associated with atypical speech into a canonical textual representation of the utterance spoken by the target speaker.

22. The system of claim 13, wherein at least a portion of the plurality of unspoken training text utterances in the second portion of the plurality of training text utterances comprise manually written text targeting particular phrases that pertain to the particular domain.

23. The system of claim 13, wherein the operations further comprise executing an unspoken text selection process to obtain the unspoken training text utterances in the second portion of the plurality of training text utterances, wherein the text selection process is configured to:
   obtain a corpus of unspoken text utterances;
   for each unspoken text utterance in the corpus of unspoken text utterances;
      determine a first probability associated with the unspoken text utterance appearing in a domain-specific language model;
      determine a second probability associated with the unspoken text utterance appearing in a background language model, the background language model trained on every unspoken text utterance in the corpus of unspoken text utterances; and
      determine a score based on the first probability, the second probability, and a number of words appearing in the corresponding unspoken text utterance, and
   select, as the unspoken training text utterances in the second portion of the plurality of training text utterances, the unspoken text utterances in the corpus of unspoken text utterances that have the N-best scores.

24. The system of claim 13, wherein:
the TTS model comprises a pre-trained reference TTS model comprising an encoder portion and a decoder portion, and
adapting the TTS model comprises adapting the pre-trained reference TTS model by tuning parameters of the decoder portion while parameters of the encoder portion remain fixed.

\* \* \* \* \*